(12) United States Patent
Biesheuvel et al.

(10) Patent No.: US 11,505,751 B2
(45) Date of Patent: Nov. 22, 2022

(54) SYSTEMS AND PROCESSES FOR IMPROVING HYDROCARBON UPGRADING

(71) Applicant: Dow Global Technologies LLC, Midland, MI (US)

(72) Inventors: Cornelis Biesheuvel, Hoek (NL); Wim M. Kamperman, Middleburg (NL); Matthijs Ruitenbeek, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/271,720

(22) PCT Filed: Aug. 28, 2019

(86) PCT No.: PCT/US2019/048566
§ 371 (c)(1),
(2) Date: Feb. 26, 2021

(87) PCT Pub. No.: WO2020/047091
PCT Pub. Date: Mar. 5, 2020

(65) Prior Publication Data
US 2021/0317372 A1    Oct. 14, 2021

Related U.S. Application Data

(60) Provisional application No. 62/725,812, filed on Aug. 31, 2018.

(51) Int. Cl.
*B01J 19/00* (2006.01)
*B01J 19/24* (2006.01)
*C10G 9/24* (2006.01)

(52) U.S. Cl.
CPC ............ *C10G 9/24* (2013.01); *B01J 19/0013* (2013.01); *B01J 19/2485* (2013.01);
(Continued)

(58) Field of Classification Search
CPC ....... B01J 3/00; B01J 3/04; B01J 19/00; B01J 19/0006; B01J 19/0013; B01J 19/24;
(Continued)

(56) References Cited

U.S. PATENT DOCUMENTS

| 1,327,023 A | 1/1920 | Cherry |
| 1,860,322 A | 5/1932 | Carter |

(Continued)

FOREIGN PATENT DOCUMENTS

| CN | 102256693 A | 11/2011 |
| CN | 102264873 A | 11/2011 |

(Continued)

OTHER PUBLICATIONS

International Search Report and Written Opinion pertaining to PCT/US2019/047218, dated Nov. 5, 2019.

(Continued)

*Primary Examiner* — Natasha E Young
(74) *Attorney, Agent, or Firm* — Dinsmore & Shohl LLP

(57) ABSTRACT

A reactor system for thermally treating a hydrocarbon-containing stream, that includes a pressure containment vessel comprising an interior chamber defined by a first end, a second end, and at least one side wall extending from the first end to the second end; and a ceramic heat transfer medium that converts electrical current to heat and is positioned within the interior chamber of the pressure containment vessel, wherein the heat transfer medium comprises an electrical resistor, an electrical lead line configured to provide electrical current to the heat transfer medium, a first end face, a second end face, and channels extending between the first end face and the second end face.

19 Claims, 2 Drawing Sheets

(52) U.S. Cl.
CPC .............. *B01J 2219/00135* (2013.01); *B01J 2219/2416* (2013.01); *B01J 2219/2438* (2013.01); *C10G 2300/4043* (2013.01)

(58) Field of Classification Search
CPC .. B01J 19/248; B01J 19/2485; B01J 2208/00; B01J 2208/00008; B01J 2208/00017; B01J 2208/00389; B01J 2208/00415; B01J 2219/00; B01J 2219/00049; B01J 2219/00051; B01J 2219/00132; B01J 2219/00135; B01J 2219/24; B01J 2219/2401; B01J 2219/2402; B01J 2219/2409; B01J 2219/2416; B01J 2219/2425; B01J 2219/2433; B01J 2219/2438; C10G 47/00; C10G 2300/00; C10G 2300/40; C10G 2300/4043; C10G 9/00; C10G 9/24
See application file for complete search history.

(56) References Cited

U.S. PATENT DOCUMENTS

| | | | |
|---|---|---|---|
| 3,546,316 A | | 12/1970 | Koszman |
| 3,641,183 A | | 2/1972 | Cahn et al. |
| 4,125,374 A | * | 11/1978 | Bode .................. G01N 33/0027 73/23.32 |
| 5,365,005 A | * | 11/1994 | Weill .................... B01J 12/005 585/500 |
| 2004/0016650 A1 | | 1/2004 | Klug |
| 2006/0116543 A1 | | 6/2006 | Bellet et al. |
| 2017/0022429 A1 | | 1/2017 | Van Willigenburg |
| 2017/0106360 A1 | | 4/2017 | Meriam |
| 2021/0113983 A1 | | 4/2021 | Mortensen et al. |
| 2021/0316262 A1 | * | 10/2021 | Biesheuvel ............ C10G 15/08 |

FOREIGN PATENT DOCUMENTS

| | | |
|---|---|---|
| CN | 105688770 A | 6/2016 |
| CN | 105874088 A | 8/2016 |
| DE | 3929413 A1 | 3/1991 |
| EP | 542597 A1 | 5/1993 |
| GB | 1338352 A | 11/1973 |
| WO | 2010070195 A2 | 6/2010 |
| WO | 2013135667 A1 | 9/2013 |

OTHER PUBLICATIONS

International Search Report and Written Opinion pertaining to PCT/US2019/047221, dated Oct. 2, 2019.
International Search Report and Written Opinion pertaining to PCT/US2019/048566, dated Nov. 12, 2019.
Smael Amghizar, et. al., New Trends in Olefin Production, Elsevier, Engineering 3 (2017) 171-178.
S.M. Sadrameli, Thermal/Catalytic cracking of hydrocarbons for the production of olefins: A state-of-the-art review 1 : thermal cracking review, Elsevier, Fuel 140 (2015) 102-115.
Schietekat, et. al., Computational Fluid Dynamics-Based Design of Finned Steam Cracking Reactors; DOI 10.1002/aic.14326, 2013.
Laurien A. Vandewalle, et. al.,Dynamic simulation of fouling in steam cracking reactors using CFD; Chemical Engineering Journal 329 (2017) 77-87.
U.S. Office Action dated Jun. 3, 2022 pertaining to U.S. Appl. No. 17/271,714, filed Feb. 26, 2021, 16 pages.
Chinese Office Action dated May 25, 2022, pertaining to CN Patent Application No. 201980049690.0, 17 pgs.

* cited by examiner

SYSTEMS AND PROCESSES FOR IMPROVING HYDROCARBON UPGRADING

CROSS REFERENCE TO RELATED APPLICATION

This application is a National Stage Entry under 35 U.S.C. § 371 of International Patent Application No. PCT/US2019/048566, now WO 2020/047091, filed Aug. 28, 2019, which claims priority to U.S. Provisional Patent Application Ser. No. 62/725,812, filed Aug. 31, 2018, both of which are incorporated by reference in their entireties.

BACKGROUND

Field

The present specification generally relates to systems and processes for converting a hydrocarbon-containing stream to desired products while minimizing carbon dioxide ($CO_2$) emissions through the use of electrical current. In particular, the present specification relates to systems and processes that use a heat transfer medium that converts electrical current to heat to heat the hydrocarbon-containing stream.

Technical Background

Feedstock ethane, propane, butane, naphtha, and other hydrocarbons must be upgraded before they can be used as a commercially valuable product, such as hydrogen, olefins, and aromatic hydrocarbons. This upgrading process conventionally utilizes a reactor system in which combustion—such as, for example, combustion of methane—is used to heat the contents of a pressure containment vessel. The combustion furnace of conventional reactor systems produces additional $CO_2$ emissions. A hydrocarbon-containing stream flows through tubular reactors disposed within the pressure containment vessel, and the tubular reactors heat the hydrocarbon-containing stream diluting it with steam, converting the hydrocarbon-containing stream to an effluent stream comprising desired products. However, the tubular reactors of the conventional system are prone to coke formation due to both temperature and negative catalytic influence. In turn, this leads to decreased production time, as the reactor must be shut down to be de-coked. Over time, the coke deposition will degrade the metal surfaces of conventional tubular reactors, leading to a loss of structural integrity and decommissioning of the tubular reactor.

Accordingly, a need exists for systems and processes for converting hydrocarbon-containing streams to desired products while reducing $CO_2$ emissions, such as those produced by conventional combustion systems and processes, and catalytic coke formation.

SUMMARY

According to one embodiment of the present disclosure, a reactor system for thermally treating a hydrocarbon-containing stream comprises: a pressure containment vessel comprising an interior chamber defined by a first end, a second end, and at least one side wall extending from the first end to the second end; and a ceramic heat transfer medium that converts electrical current to heat and is positioned within the interior chamber of the pressure containment vessel, wherein the heat transfer medium comprises an electrical resistor, an electrical lead line configured to provide electrical current to the heat transfer medium, a first end face, a second end face, and channels extending between the first end face and the second end face.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
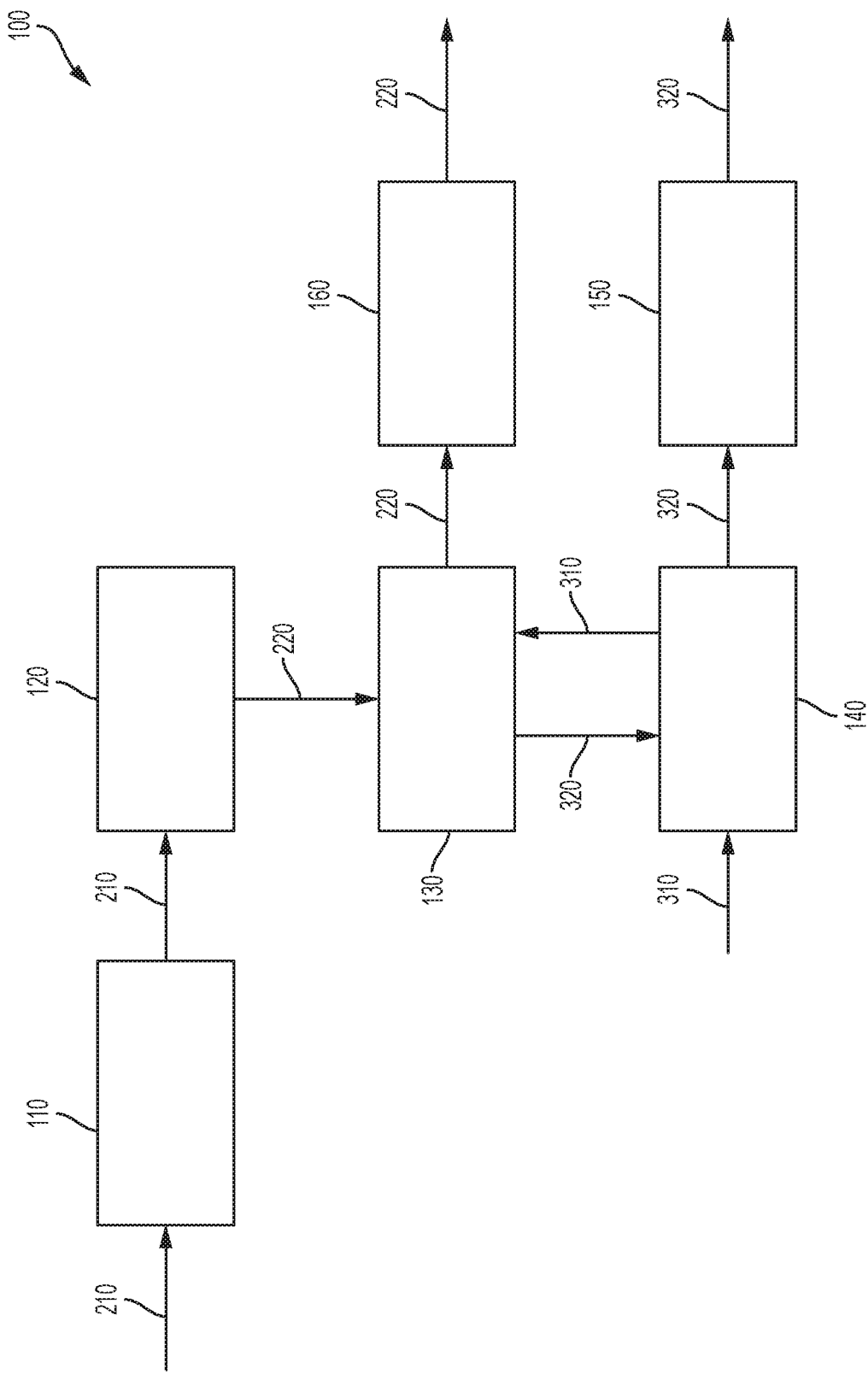
FIG. 1 schematically depicts a first embodiment of a system and process for converting hydrocarbon-containing streams to desired products according to embodiments disclosed and described herein.

Reference will now be made in detail to embodiments of systems and processes for converting hydrocarbon-containing streams to desired products, such as, for example, at least one of hydrogen, olefins, or aromatic hydrocarbons, embodiments of which are illustrated in the accompanying drawings. Whenever possible, the same reference numerals will be used throughout the drawings to refer to the same or like parts.

In one embodiment, a reactor system for thermally treating a hydrocarbon-containing stream comprises: a pressure containment vessel comprising an interior chamber defined by a first end, a second end, and at least one side wall extending from the first end to the second end; and a heat transfer medium that converts electrical current to heat and is positioned within the interior chamber of the pressure containment vessel, wherein the heat transfer medium comprises a first end face, a second end face, and channels extending between the first end face and the second end face.

In another embodiment, a process for thermally treating a hydrocarbon-containing stream comprises: introducing the hydrocarbon-containing stream into channels of a heat transfer medium, wherein the heat transfer medium is positioned within an interior chamber of a pressure containment vessel; pressurizing the pressure containment vessel and the heat transfer medium without heating the pressure containment vessel or the heat transfer medium; supplying electrical current to the heat transfer medium; converting the electrical current to heat, thereby increasing the temperature of the heat transfer medium, heating the hydrocarbon-containing stream within the channels of the heat transfer medium; converting the hydrocarbon-containing stream to an effluent stream within the channels of the heat transfer medium, and removing the effluent stream from the channels of the heat transfer medium.

With reference now to FIG. 1, an embodiment of system for converting hydrocarbon-containing streams to desired products is provided. It should be understood that the embodiment depicted in FIG. 1 is exemplary and does not limit the scope of this disclosure. As shown in the embodiment depicted in FIG. 1, a system 100 for converting a hydrocarbon-containing stream 210 to an effluent stream 220 that comprises desired products includes, in series and/or in parallel, a heat exchanger 110, a pressure containment vessel 120, a quench exchanger 130, a coolant drum 140, a superheater 150, and a second heat exchanger 160. It should be understood that according to various embodiments, the system 100 may include various combinations of the above-listed components of the system 100. Furthermore, the system 100 may comprise one or more heat exchangers, which may be thermally coupled to one another. The system 100 may further comprise one or more superheaters 150, in series and/or in parallel.

Figure 2:
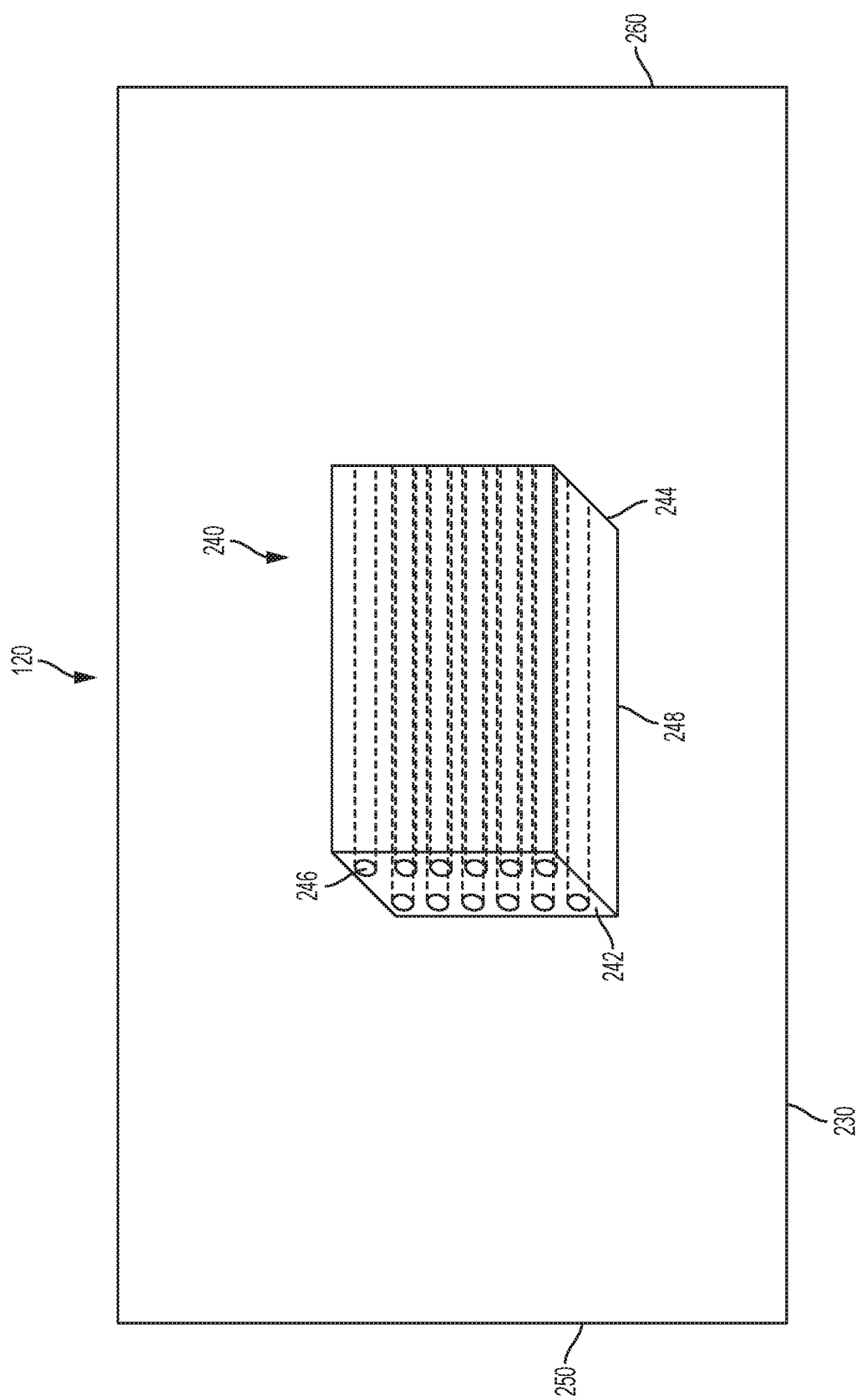
FIG. 2 schematically depicts a pressure containment vessel and its components according to embodiments disclosed and described herein.

According to the embodiment shown in FIG. 2, the pressure containment vessel 120 comprises an interior chamber and a heat transfer medium 240. The interior chamber of the pressure containment vessel 120 is defined by a first end 250, a second end 260, and at least one side wall 230 extending from the first end 250 to the second end 260. The heat transfer medium 240 converts electrical current to heat and is positioned within the interior chamber of the pressure containment vessel 120. Furthermore, the heat transfer medium 240 comprises a first end face 242, a second end face 244, and channels 246 extending between the first end face 242 and the second end face 244. The second end face 244 may be placed against the second end 260 to avoid mixing the hydrocarbon-containing stream 210 and the effluent stream 220. The channels 246 of the heat transfer medium 240 may be fluidly coupled to the interior chamber of the pressure containment vessel 120. The mechanism for fluid coupling from the second end 244 of the heat transfer medium 240 to an inlet of the quench exchanger 130 may not be heated. In embodiments, the hydrocarbon-containing stream 210 enters the channels 246 of the heat transfer medium 240 at the first end face 242 and travels through the channels 246 of the heat transfer medium 240 to the second end face 244 of the heat transfer material 240.

According to embodiments, the heat transfer medium 240 is formed from a material that is not electrically conductive, and the heat transfer medium 240 is capable of functioning at the operating conditions of the pressure containment vessel 120. Furthermore, the heat transfer medium 240 is formed from a material that is not chemically reactive unless intended to be chemically reactive for a catalytic purpose. Specifically, the heat transfer medium 240 may not produce catalytic coke, which can extend the lifetime of the reactor system. In some embodiments, the heat transfer medium 240 may be cylindrical, square, rectangular, spherical, or pyramidal, although the geometry of the heat transfer medium 240 is not limited. The heat transfer medium 240 may be any shape through which the hydrocarbon-containing stream may flow. In some embodiments, the heat transfer medium 240 comprises at least one of ceramic and/or metal. The heat transfer medium 240 comprises materials that do not melt or deform under the temperature and pressure of the reaction conditions. That is, the heat transfer medium 240 may operate at a temperature ranging from 300° C. to 450° C., or from 600° C. to 1200° C., such as from 800° C. to 1000° C., from 850° C. to 950° C., or from 825° C. to 900° C.; and a pressure of at least 1 bar (100 kPa), such as at least 2 bar (200 kPa), or at least 3 bar (300 kPa). In other embodiments, the pressure may at least 10 bar (1000 kPa), at least 15 bar (1500 kPa), at least 25 bar (2500 kPa), at least 30 bar (3000 kPa), at least 40 bar (4000 kPa), or at least 50 bar (5000 kPa). In some embodiments, the heat transfer medium 240 may operate at a pressure of from 0.5 to 3 bar, from 1 to 3 bar, from 2 to 3 bar, from 0.5 to 2 bar, from 1 to 2 bar, or from 0.5 to 1 bar. Furthermore, in some embodiments, the heat transfer medium 240 may include at least one of silicon carbide, graphite, and aluminum. In some embodiments, the heat transfer medium 240 may not include any or high degrees of nickel or chromium.

The heat transfer medium 240 may, according to embodiments, comprise at least one of carbides, oxides, and nitrides. In some embodiments, the heat transfer medium 240 may comprise silicon nitride. In other embodiments, the heat transfer medium 240 may comprise barium titanate. Carbides that may be used in embodiments to form the heat transfer medium 240 include silicon carbide. The oxides may be used in embodiments to form the heat transfer medium 240 include at least one of aluminum oxide, magnesium oxide, silicon dioxide (or quartz), feldspar, and zirconium oxide. In embodiments, the nitrides used to form the heat transfer medium 240 may include at least one of silicon nitride, boron nitride, and aluminum nitride. The heat transfer medium 240 may further comprise any metal that can withstand the operating temperatures and pressures described in this application. The heat transfer medium 240 may comprise a ceramic comprised of at least one of carbides, oxides, nitrides, metals, nonmetals, and metalloids. The heat transfer medium 240 may have high thermal conductivity and may be chemically compatible with electrical heating elements, the hydrocarbon-containing stream 210, and the effluent stream 220.

In some embodiments, the heat transfer medium 210 further comprises a catalyst. The catalyst may comprise, according to embodiments, at least one of silver, iron oxide, molybdenum oxide, vanadium oxide, chromium oxide, nickel oxide, copper oxide, zirconium oxide, potassium carbonate, potassium oxide, titanium oxide, cadmium oxide, aluminum oxide, tin oxide, and/or platinum oxide.

The length of the channels 246 is defined by the heat transfer flux and residence time. Each individual channel of the channels 246 may have a channel cross flow area of from 450 to 550 $mm^2$, from 400 to 600 $mm^2$, from 300 to 700 $mm^2$, from 200 to 800 $mm^2$, or of from 475 to 525 $mm^2$. The channel cross flow area is defined by allowable pressure drop due to linear gas velocity. The pressure drop may range from 5 to 500 kPa, from 50 to 300 kPa, from 50 to 200 kPa, from 50 to 175 kPa, from 50 to 150 kPa, from 50 to 130 kPa, from 50 to 120 kPa, from 50 to 100 kPa, from 50 to 75 kPa, from 75 to 300 kPa, from 75 to 200 kPa, from 75 to 175 kPa, from 75 to 150 kPa, from 75 to 130 kPa, from 75 to 120 kPa, from 75 to 100 kPa, from 100 to 300 kPa, from 100 to 200 kPa, from 100 to 175 kPa, from 100 to 150 kPa, from 100 to 130 kPa, from 100 to 120 kPa, from 120 to 300 kPa, from 120 to 200 kPa, from 120 to 175 kPa, from 120 to 150 kPa, from 120 to 130 kPa, from 130 to 300 kPa, from 130 to 200 kPa, from 130 to 175 kPa, from 130 to 150 kPa, from 150 to 300 kPa, from 150 to 200 kPa, from 150 to 175 kPa, from 175 to 300 kPa, from 175 to 200 kPa, or from 200 to 300 kPa. In some embodiments, the pressure drop may be 110 kPa. The heat transfer medium 240 may comprise from 1 to 1000 channels, from 1 to 800 channels, from 1 to 600 channels, from 1 to 400 channels, from 1 to 300 channels, from 1 to 250 channels, from 1 to 200 channels, from 1 to 150 channels, from 1 to 100 channels, from 1 to 50 channels, from 1 to 25 channels, from 25 to 1000 channels, from 25 to 800 channels, from 25 to 600 channels, from 25 to 400 channels, from 25 to 300 channels, from 25 to 250 channels, from 25 to 200 channels, from 25 to 150 channels, from 25 to 100 channels, from 25 to 50 channels, from 50 to 1000 channels, from 50 to 800 channels, from 50 to 600 channels, from 50 to 400 channels, from 50 to 300 channels, from 50 to 250 channels, from 50 to 200 channels, from 50 to 150 channels, from 50 to 100 channels, from 100 to 1000 channels, from 100 to 800 channels, from 100 to 600 channels, from 100 to 400 channels, from 100 to 300 channels, from 100 to 250 channels, from 100 to 200 channels, from 100 to 150 channels, from 150 to 1000 channels, from 150 to 800 channels, from 150 to 600 channels, from 150 to 400 channels, from 150 to 300 channels, from 150 to 250 channels, from 150 to 200 channels, from 200 to 1000 channels, from 200 to 800 channels, from 200 to 600 channels, from 200 to 400 channels, from 200 to 300 channels, from 200 to 250 channels, from 250 to 1000 channels, from 250 to 800 channels, from 250 to 600 channels, from 250 to 400 channels, from 250 to 300 channels, from 300 to 1000 channels, from 300 to 800 channels, from 300 to 600 channels, from 300 to 400 channels, from 400 to 1000 channels, from 400 to 800 channels, from 400 to 600 channels, from 600 to 1000 channels, from 600 to 800 channels, or from 800 to 1000 channels 246. Increasing the amount of channels will result in increasing the amount of product flow.

Furthermore, in some embodiments, the first end face 242 may have a smaller surface area than the second end face 244. This may allow the channels 246 to have a cross sectional area that increases over the length of the channel 246 from the first end face 242 to the second end face 244, resulting in a tapering effect. Specifically, the channels 246 may have a smaller cross sectional area at the first end face 242 than at the second end face 244. In some embodiments, this may increase the velocity of the hydrocarbon stream 210 as it moves through the channels 246 of the heat transfer medium 240 because as the hydrocarbon-containing stream 210 reacts within the channels 246 of the heat transfer medium 240, the number of molecules within the hydrocarbon-containing stream 210 increases. Therefore, the larger cross-sectional area within the tapering channel 246 may accommodate the increase in the number of molecules.

In some embodiments, the duty required for the reaction within the heat transfer medium 240 may range from 500 to 5000 kJ/kg, from 500 to 3000 kJ/kg, from 500 to 2500 kJ/kg, from 500 to 2000 kJ/kg, from 500 to 1500 kJ/kg, from 500 to 1000 kJ/kg, from 1000 to 5000 kJ/kg, from 1000 to 3000 kJ/kg, from 1000 to 2500 kJ/kg, from 1000 to 2000 kJ/kg, from 1000 to 1500 kJ/kg, from 1500 to 5000 kJ/kg, from 1500 to 3000 kJ/kg, from 1500 to 2500 kJ/kg, from 1500 to 2000 kJ/kg, from 2000 to 5000 kJ/kg, from 2000 to 3000 kJ/kg, from 2000 to 2500 kJ/kg, from 2500 to 5000 kJ/kg, from 2500 to 3000 kJ/kg, or from 3000 to 5000 kJ/kg.

In some embodiments, the channels 246 within the heat transfer medium 240 may have a surface area of from 200 to 500,000 $mm^2$, 200 to 100,000 $mm^2$, from 200 to 50,000 $mm^2$, from 200 to 25,000 $mm^2$, from 200 to 5,000 $mm^2$, from 200 to 1,000 $mm^2$, from 200 to 750 $mm^2$, from 200 to 650 $mm^2$, from 200 to 400 $mm^2$, from 400 to 500,000 $mm^2$, 400 to 100,000 $mm^2$, from 400 to 50,000 $mm^2$, from 400 to 25,000 $mm^2$, from 400 to 5,000 $mm^2$, from 400 to 1,000 $mm^2$, from 400 to 750 $mm^2$, from 400 to 650 $mm^2$, from 650 to 500,000 $mm^2$, 650 to 100,000 $mm^2$, from 650 to 50,000 $mm^2$, from 650 to 25,000 $mm^2$, from 650 to 5,000 $mm^2$, from 650 to 1,000 $mm^2$, from 650 to 750 $mm^2$, from 750 to 500,000 $mm^2$, 750 to 100,000 $mm^2$, from 750 to 50,000 $mm^2$, from 750 to 25,000 $mm^2$, from 750 to 5,000 $mm^2$, from 750 to 1,000 $mm^2$, from 1,000 to 500,000 $mm^2$, 1,000 to 100,000 $mm^2$, from 1,000 to 50,000 $mm^2$, from 1,000 to 25,000 $mm^2$, from 1,000 to 5,000 $mm^2$, from 5,000 to 500,000 $mm^2$, 5,000 to 100,000 $mm^2$, from 5,000 to 50,000 $mm^2$, from 5,000 to 25,000 $mm^2$, from 25,000 to 500,000 $mm^2$, 25,000 to 100,000 $mm^2$, from 25,000 to 50,000 $mm^2$, from 50,000 to 100,000 $mm^2$, from 50,000 to 500,000 $mm^2$, or from 100,000 to 500,000 $mm^2$.

The channels 246 of the heat transfer medium 240 may have a total surface area of from 0.02 to 1 $m^2$ per kilogram per hour of fluid flow at a velocity of from 20 to 250 m/s, from 0.02 to 0.6 $m^2$ per kilogram per hour of fluid flow at a velocity of from 20 to 250 m/s, from 0.02 to 0.2 $m^2$ per kilogram per hour of fluid flow at a velocity of from 20 to 250 m/s, from 0.02 to 0.1 $m^2$ per kilogram per hour of fluid flow at a velocity of from 20 to 250 m/s, from 0.02 to 0.08 $m^2$ per kilogram per hour of fluid flow at a velocity of from 20 to 250 m/s, from 0.02 to 0.06 $m^2$ per kilogram per hour of fluid flow at a velocity of from 20 to 250 m/s, from 0.06 to 1 $m^2$ per kilogram per hour of fluid flow at a velocity of from 20 to 250 m/s, from 0.06 to 0.6 $m^2$ per kilogram per hour of fluid flow at a velocity of from 20 to 250 m/s, from 0.06 to 0.2 $m^2$ per kilogram per hour of fluid flow at a velocity of from 20 to 250 m/s, from 0.06 to 0.1 $m^2$ per kilogram per hour of fluid flow at a velocity of from 20 to 250 m/s, from 0.06 to 0.08 $m^2$ per kilogram per hour of fluid flow at a velocity of from 20 to 250 m/s, from 0.08 to 1 $m^2$ per kilogram per hour of fluid flow at a velocity of from 20 to 250 m/s, from 0.08 to 0.6 $m^2$ per kilogram per hour of fluid flow at a velocity of from 20 to 250 m/s, from 0.08 to 0.2 $m^2$ per kilogram per hour of fluid flow at a velocity of from 20 to 250 m/s, from 0.08 to 0.1 $m^2$ per kilogram per hour of fluid flow at a velocity of from 20 to 250 m/s, from 0.1 to 1 $m^2$ per kilogram per hour of fluid flow at a velocity of from 20 to 250 m/s, from 0.1 to 0.6 $m^2$ per kilogram per hour of fluid flow at a velocity of from 20 to 250 m/s, from 0.1 to 0.2 $m^2$ per kilogram per hour of fluid flow at a velocity of from 20 to 250 m/s, from 0.2 to 1 $m^2$ per kilogram per hour of fluid flow at a velocity of from 20 to 250 m/s, from 0.2 to 0.6 $m^2$ per kilogram per hour of fluid flow at a velocity of from 20 to 250 m/s, or from 0.6 to 1 $m^2$ per kilogram per hour of fluid flow at a velocity of from 20 to 250 m/s.

The heat transfer medium may comprise from 1 to 500 heating elements, from 1 to 300 heating elements, from 1 to 200 heating elements, from 1 to 100 heating elements, from 1 to 70 heating elements, from 1 to 50 heating elements, from 1 to 30 heating elements, from 1 to 20 heating elements, from 1 to 10 heating elements, from 10 to 500 heating elements, from 10 to 300 heating elements, from 10 to 200 heating elements, from 10 to 100 heating elements, from 10 to 70 heating elements, from 10 to 50 heating elements, from 10 to 30 heating elements, from 10 to 20 heating elements, from 20 to 500 heating elements, from 20 to 300 heating elements, from 20 to 200 heating elements, from 20 to 100 heating elements, from 20 to 70 heating elements, from 20 to 50 heating elements, from 20 to 30 heating elements, from 30 to 500 heating elements, from 30 to 300 heating elements, from 30 to 200 heating elements, from 30 to 100 heating elements, from 30 to 70 heating elements, from 30 to 50 heating elements, from 50 to 500 heating elements, from 50 to 300 heating elements, from 50 to 200 heating elements, from 50 to 100 heating elements, from 50 to 70 heating elements, from 70 to 500 heating elements, from 70 to 300 heating elements, from 70 to 200 heating elements, from 70 to 100 heating elements, from 100 to 500 heating elements, from 100 to 300 heating elements, from 100 to 200 heating elements, from 200 to 500 heating elements, from 200 to 300 heating elements, or from 300 to 500 heating elements. The heating elements may be made from any material in any shape and any size that may heat the heat transfer medium 240 to operating temperature or reaction temperature as described herein. The heating elements may be one or more of heating plates, heating wires, heating tubes, heating grids, and/or any other heating device. In some embodiments, the heat transfer medium produces from 100 to 1000 kW, from 100 to 800 kW, from 100 to 500 kW, from 100 to 400 kW, from 100 to 350 kW, from 100 to 300 kW, from 100 to 200 kW, from 200 to 1000 kW, from 200 to 800 kW, from 200 to 500 kW, from 200 to 400 kW, from 200 to 350 kW, from 200 to 300 kW, from 300 to 1000 kW, from 300 to 800 kW, from 300 to 500 kW, from 300 to 400 kW, from 300 to 350 kW, from 350 to 1000 kW, from 350 to 800 kW, from 350 to 500 kW, from 350 to 400 kW, from 400 to 1000 kW, from 400 to 800 kW, from 400 to 500 kW, from 500 to 1000 kW, from 500 to 800 kW, or from 800 to 1000 kW per heating element. In other embodiments, the heat transfer medium may produce from 10 to 100 kW, from 10 to 80 kW, from 10 to 60 kW, from 10 to 40 kW, from 10 to 20 kW, from 20 to 100 kW, from 20 to 80 kW, from 20 to 60 kW, from 20 to 40 kW, from 40 to 100 kW, from 40 to 80 kW, from 40 to 60 kW, from 60 to 100 kW, from 60 to 80 kW, or from 80 to 100 kW per heating element. Thus, in embodiments, the heat transfer medium produces from 10 kW to 1000 kW. In some embodiments, the heating element may include an electrical resistor material, which may use electrical current to generate heat. Specifically, the electrical resistor material may convert electricity to heat. The heat may be conducted through the ceramic of the heat transfer material 240 to the channels 246. In some embodiments, the heating element may be located closer to the channels 246 than to the outer surface 248 of the heat transfer material 240. In some embodiments, the hydrocarbon-containing stream 210 may not directly contact the heating element. In other embodiments, the heat transfer material 240 may function as a thermal conductor and mechanical separator between the hydrocarbon-containing stream 210 and the heating element.

In some embodiments, the heat transfer medium 240 may have a heat flux of from 2,000 to 20,000 $kJ/m^2s$, from 2,000 to 10,000 $kJ/m^2s$, from 2,000 to 8,000 $kJ/m^2s$, from 2,000 to 7,000 $kJ/m^2s$, from 2,000 to 6,000 $kJ/m^2s$, from 2,000 to 4,000 $kJ/m^2s$, from 4,000 to 20,000 $kJ/m^2s$, from 4,000 to 10,000 $kJ/m^2s$, from 4,000 to 8,000 $kJ/m^2s$, from 4,000 to 7,000 $kJ/m^2s$, from 4,000 to 6,000 $kJ/m^2s$, from 6,000 to 20,000 $kJ/m^2s$, from 6,000 to 10,000 $kJ/m^2s$, from 6,000 to 8,000 $kJ/m^2s$, from 6,000 to 7,000 $kJ/m^2s$, from 7,000 to 20,000 $kJ/m^2s$, from 7,000 to 10,000 $kJ/m^2s$, from 7,000 to 8,000 $kJ/m^2s$, from 8,000 to 20,000 $kJ/m^2s$, from 8,000 to 10,000 $kJ/m^2s$, or from 10,000 to 20,000 $kJ/m^2s$. In some embodiments, the heat transfer medium 240 may have a heat flux of from 200 to 2,000 $kJ/m^2s$, from 200 to 1,000 $kJ/m^2s$, from 200 to 800 $kJ/m^2s$, from 200 to 700 $kJ/m^2s$, from 200 to 600 $kJ/m^2s$, from 200 to 400 $kJ/m^2s$, from 400 to 2,000 $kJ/m^2s$, from 400 to 1,000 $kJ/m^2s$, from 400 to 800 $kJ/m^2s$, from 400 to 700 $kJ/m^2s$, from 400 to 600 $kJ/m^2s$, from 600 to 2,000 $kJ/m^2s$, from 600 to 1,000 $kJ/m^2s$, from 600 to 800 $kJ/m^2s$, from 600 to 700 $kJ/m^2s$, from 700 to 2,000 $kJ/m^2s$, from 700 to 1,000 $kJ/m^2s$, from 700 to 800 $kJ/m^2s$, from 800 to 2,000 $kJ/m^2s$, from 800 to 1,000 $kJ/m^2s$, or from 1,000 to 2,000 $kJ/m^2s$.

The heat transfer medium 240 may have a specific heat capacity of from 0.5 to 1 J/g K. In other embodiments, the heat transfer medium 240 may have a specific heat capacity of from 0.2 to 10 J/g K, from 0.2 to 8 J/g K, from 0.2 to 6 J/g K, from 0.2 to 4 J/g K, from 0.2 to 2 J/g K, from 0.2 to 1 J/g K, from 0.2 to 0.8 J/g K, from 0.2 to 0.5 J/g K, from 0.5 to 10 J/g K, from 0.5 to 8 J/g K, from 0.5 to 6 J/g K, from 0.5 to 4 J/g K, from 0.5 to 2 J/g K, from 0.5 to 1 J/g K, from 0.5 to 0.8 J/g K, from 0.8 to 10 J/g K, from 0.8 to 8 J/g K, from 0.8 to 6 J/g K, from 0.8 to 4 J/g K, from 0.8 to 2 J/g K, from 0.8 to 1 J/g K, from 1 to 10 J/g K, from 1 to 8 J/g K, from 1 to 6 J/g K, from 1 to 4 J/g K, from 1 to 2 J/g K, from 2 to 10 J/g K, from 2 to 8 J/g K, from 2 to 6 J/g K, from 2 to 4 J/g K, from 4 to 10 J/g K, from 4 to 8 J/g K, from 4 to 6 J/g K, from 6 to 10 J/g K, from 6 to 8 J/g K, or from 8 to 10 J/g K.

The heat transfer medium 240 may have a thermal conductivity of from 150 to 200 W/m K. In other embodiments, the heat transfer medium 240 may have a thermal conductivity of from 25 to 10,000 W/m K, from 25 to 5,000 W/m K, from 25 to 1,000 W/m K, from 25 to 700 W/m K, from 25 to 500 W/m K, from 25 to 300 W/m K, from 25 to 250 W/m K, from 25 to 200 W/m K, from 25 to 150 W/m K, from 25 to 100 W/m K, from 25 to 50 W/m K, from 50 to 10,000 W/m K, from 50 to 5,000 W/m K, from 50 to 1,000 W/m K, from 50 to 700 W/m K, from 50 to 500 W/m K, from 50 to 300 W/m K, from 50 to 250 W/m K, from 50 to 200 W/m K, from 50 to 150 W/m K, from 50 to 100 W/m K, from 100 to 10,000 W/m K, from 100 to 5,000 W/m K, from 100 to 1,000 W/m K, from 100 to 700 W/m K, from 100 to 500 W/m K, from 100 to 300 W/m K, from 100 to 250 W/m K, from 100 to 200 W/m K, from 100 to 150 W/m K, from 150 to 10,000 W/m K, from 150 to 5,000 W/m K, from 150 to 1,000 W/m K, from 150 to 700 W/m K, from 150 to 500 W/m K, from 150 to 300 W/m K, from 150 to 250 W/m K, from 150 to 200 W/m K, from 200 to 10,000 W/m K, from 200 to 5,000 W/m K, from 200 to 1,000 W/m K, from 200 to 700 W/m K, from 200 to 500 W/m K, from 200 to 300 W/m K, from 200 to 250 W/m K, from 250 to 10,000 W/m K, from 250 to 5,000 W/m K, from 250 to 1,000 W/m K, from 250 to 700 W/m K, from 250 to 500 W/m K, from 300 to 10,000 W/m K, from 300 to 5,000 W/m K, from 300 to 1,000 W/m K, from 300 to 700 W/m K, from 300 to 500 W/m K, from 500 to 10,000 W/m K, from 500 to 5,000 W/m K, from 500 to 1,000 W/m K, from 500 to 700 W/m K, from 700 to 10,000 W/m K, from 700 to 5,000 W/m K, from 700 to 1,000 W/m K, from 1,000 to 10,000 W/m K, from 1,000 to 5,000 W/m K, or from 5,000 to 10,000 W/m K.

In some embodiments, the heat transfer medium 240 may have a total power of 18.6 MW. In some embodiments, the heat transfer medium 240 may have a total power of from 5 to 10 kW, from 5 to 50 kW, from 5 to 100 kW, from 5 to 500 kW, from 5 to 1000 kW, from 5 to 2000 kW, from 10 to 50 kW, from 10 to 100 kW, from 10 to 500 kW, from 10 to 1000 kW, from 10 to 2000 kW, from 50 to 100 kW, from 50 to 500 kW, from 50 to 1000 kW, from 50 to 2000 kW, from 100 to 500 kW, from 100 to 1000 kW, from 100 to 2000 kW, from 500 to 1000 kW, from 500 to 2000 kW, or from 1000 to 2000 kW. In some embodiments, the heat transfer medium 240 may have a total power of from 5 to 100 MW, from 5 to 50 MW, from 5 to 30 MW, from 5 to 20 MW, from 5 to 15 MW, from 5 to 10 MW, from 10 to 100 MW, from 10 to 50 MW, from 10 to 30 MW, from 10 to 20 MW, from 10 to 15 MW, from 15 to 100 MW, from 15 to 50 MW, from 15 to 30 MW, from 15 to 20 MW, from 20 to 100 MW, from 20 to 50 MW, from 20 to 30 MW, from 30 to 100 MW, from 30 to 50 MW, or from 50 to 100 MW.

The channels 246 of the heat transfer medium 240 may comprise boundary layer disturbing elements that increase fluid turbulence when a fluid flows through the channels 246. The boundary layer disturbing elements are any type of concavity within the surface of the channels 246 or any type of raised elevation within the surface of the channels 246. Specifically, the boundary layer disturbing elements are any deviation from the parallel plane flush with the surface of the channels 246. The boundary layer disturbing elements may be of any shape or size.

The heat transfer medium 240 may, in embodiments, be removably positioned in the pressure containment vessel 120. As used throughout this disclosure, the term "removably positioned" refers to the removability of a system component from its placement within the system. Specifically, as this relates to the heat transfer medium 240, the heat transfer medium 240 may be positioned within the pressure containment vessel 120 and may be removed from this position, placed in an alternative position within the pressure containment vessel 120, or removed from the pressure containment vessel 120 without damaging either the pressure containment vessel 120 or the heat transfer medium 240. The heat transfer medium 240 may further comprise an electrical resistor, an electrical lead line that is removably coupled to a source of electrical current, and an electrical insulator. As used throughout this disclosure, the term "removably coupled" refers to the removability of a system component from its coupling within the system without damaging either of the coupled components. Specifically, as this relates to the electrical lead line, the electrical lead line may be coupled to a source of electrical current, and may be removed from this coupling, meaning that the electrical lead line may no longer be coupled to a source of electrical current.

As discussed above, the heat transfer medium 240 may further comprise one or more electrical circuits, an electrical resistor, an electrical lead line, and an electrical insulator. The one or more electrical circuits may comprise one or more electrodes. An electrode is an electrical conductor used to make contact with a nonmetallic member which may or may not be part of the circuit. The nonmetallic member may include the heat transfer medium 240. The electrical circuits may be positioned in or on the heat transfer medium 240 such that the electrical circuits conduct electrical current through or on the heat transfer medium 240. In embodiments, the heat transfer medium 240 comprises one or more heating elements and one or more electrical circuits comprising electrodes, such that the heating elements are electrically coupled to the electrodes and convert electrical current to heat. In some embodiments, the heating elements may transfer heat to the heat transfer medium 240, which thermally conducts the heat from the heating elements to the channels 246. In other embodiments, the heating elements may be positioned in the channels so that the heating elements directly conduct heat into the channels. The electrodes may be provided on a surface of the heat transfer medium 240, incorporated into the heat transfer medium 240, or be dispersed throughout the heat transfer medium 240, as nonlimiting examples. Similarly, the heating elements may be provided on a surface of the heat transfer medium 240, incorporated into the heat transfer medium 240, or be dispersed throughout the heat transfer medium 240, as nonlimiting examples. The surface of the heat transfer medium 240 may include the first end face 242 and the second end face 244 of the heat transfer medium 240. An electrical lead line is an electrical coupling mechanism consisting of a length of wire or a metal pad that is designed to electrically couple two locations, such as, for example, by coupling the above-mentioned electrical circuits to a power source.

An electrical insulator is a material whose internal electric charges do not flow freely; very little electric current will flow through it under the influence of an electric field. The property that distinguishes an electrical insulator from other materials, such as conductors and semiconductors, is their electrical resistivity; insulators have higher resistivity than semiconductors or conductors. Nonlimiting examples of electrical insulators may include glass or ceramic which can withstand operating conditions in the heat transfer medium 240 may be used as electrical insulators. Furthermore, the electrical insulators may be gas tight, meaning that gas may not leak from the heat transfer medium 240 through the electrical insulators.

Resistors precisely control the amount of resistance in an electrical circuit; providing more control over resistivity than insulators. In embodiments, a resistor is a passive two-terminal electrical component that implements electrical resistance as a circuit element. As nonlimiting examples, resistors may be used to reduce current flow and to divide voltages, thereby generating heat from the electrical current in a controlled fashion. Accordingly, resistors may be used to convert electrical current to heat. Fixed resistors have resistances that only change slightly with temperature, time, or operating voltage. The electrical resistors may include a resistor specifically selected for specific electrical resistance with the intent of generating heat. Electrical resistors may be provided on the surface of the heat transfer medium 240, incorporated into the heat transfer medium 240, or be dispersed throughout the heat transfer medium 240, as nonlimiting examples. Thus, in one or more embodiments, electrical current is introduced to the heat transfer medium, and the electrical current is converted to heat by the resistors, thereby heating the heat transfer medium and, in turn, heating the channels within the heat transfer medium. In some embodiments, such as, but not limited to, when the heat transfer material comprises graphite, the heat transfer material may further serve as a resistor.

In some embodiments, the electrical insulator may be provided between the electrical resistors and the interior chamber of the pressure containment vessel 120, such that greater electrical current than needed for reaction conditions may not be converted to heat by the electrical resistors and may be contained within the heat transfer medium 240 and not dissipate into the interior chamber of the pressure containment vessel 120. Specifically, the electrical insulator may be used to contain the electricity within the heat transfer medium 240, thereby preventing other components of the system 100 from conducting the electrical current. The insulator material has high enough electrical resistance to avoid heat generation. The electrical insulator transfers electrical current through the wall of the pressure containing equipment and couples to the heat transfer medium. The heat within the heat transfer medium may 240 may be transferred to the quench exchanger 130 via the effluent stream 220.

In some embodiments, a critical flow venturi may be mechanically coupled to the first end face 242 of the heat transfer medium 240. In other embodiments, the critical flow venturi may be an integrally formed part of the heat transfer medium 240. The critical flow venturi may improve fluid flow across the heat transfer medium 240 by reducing turbulence. A critical flow venturi is a fluid flow management device where a fluid accelerates as it approaches the critical flow venturi. As differential pressure increases, the velocity of the fluid at the critical flow venturi increases.

When the velocity of the fluid reaches the speed of sound, as defined by the temperature and pressure at the critical flow venturi, the fluid is considered critical. Once the flow has reached the critical state, increasing the differential pressure will not affect the fluid flow rate. It should be understood that, like other components in the system, the critical flow venturi is an optional component.

As disclosed previously, the heat created by the conversion of electrical current to heat by the electrical resistors may be contained within the heat transfer medium 240 and may not dissipate into the interior chamber of the pressure containment vessel 120. However, in some embodiments, thermal radiation and other secondary thermal effects may cause some heat to dissipate into the interior chamber of the pressure containment vessel 120 due to convection flow. To prevent heat from dissipating into the interior chamber of the pressure containment vessel 120, the pressure containment vessel 120 may be lined inside with a thermal insulation material to minimize heat loss and to minimize heat transfer from the heat transfer medium 240 to the pressure containment vessel 120. This thermal insulation material may be a refractory material, such as, but not limited to, andalusite, mulcoa, molochite, chamottes, clay, fused silica, high alumina, metakaolin, and bentonite. In some embodiments, the thermal insulation material may act as a barrier between the outer walls of the pressure containment vessel 120 and the heat transfer material 240.

In some embodiments, the reactor system is coupled to a source of electrical current that provides electrical current to the heat transfer medium 240 via the electrical lead lines. The electrical lead lines transfer the electrical current from the source of electrical current to the heat transfer medium 240 disposed within the pressure containment vessel 120 via an electrical coupling with both the source of electrical current and the heat transfer medium 240. In various embodiments, the source of electrical current may be a renewable energy source, leading to no $CO_2$ emissions. The source of electrical current may, in embodiments, be a battery, solar power, nuclear power, wind energy, steam energy, natural gas, hydroelectric power, coal, or the like. The electrical current may be decreased or increased outside of the system 100. In some embodiments, the electrical current may be actively controlled, such as by being turned on and off, or being decreased and increased, to control the heat generated in the heat transfer medium 240. Furthermore, in some embodiments, there may be more than one electrical currents through the heat transfer medium 240. These one or more currents may control one or more reaction zones within the heat transfer medium 240, thereby specifically generating heat in one or more reaction zones within the heat transfer medium 240. A reaction zone is a portion of the heat transfer medium 240 that is capable of creating reaction conditions as defined herein. In some embodiments, these one or more electrical currents may be actively controlled, and decreased or increased to control the heat generated in the one or more reaction zones in the heat transfer medium 240.

In some embodiments, the heat transfer medium 240 comprises one or more reaction zones. In some embodiments, the heat transfer medium 240 comprises at least two reaction zones. The at least two reaction zones may be in parallel or in series. Each of these at least two reaction zones independently receives electrical current that may be converted to heat. The voltage of the electrical current along with the specific amperes of the electrical current are indicative of the heat of the heat transfer medium 240. Specifically, the temperature of the heat transfer medium 240 during the process of converting the hydrocarbon-containing stream 210 may be determined from the values of the resistivity of the heat transfer medium 240 and the amperes of the electrical current that is converted to heat in the heat transfer medium 240. Joule's first law states that the power (P) of heating generated by an electrical conductor is proportional to the product of its resistance (R) and the square of the current (I), as shown by Equation 1:

$$P \propto I^2 R \tag{1}$$

Various zones of the heat transfer medium 240 may, according to embodiments, be designed to have differing resistivities, which may be taken into account when determining the desired heat of the heat transfer medium 240 within specific zones. This may be accomplished by providing different resistor materials and/or different quantities of resistor materials at the different zones of the heat transfer medium 240. Differing resistivities may lead to differing amounts of heat generation in various zones of the heat transfer medium 240. Differing amounts of heat generation in various zones of the heat transfer medium 240 may also be accomplished by varying the electrical current in the heat transfer medium 240.

According to embodiments, the pressure of the interior chamber of the pressure containment vessel 120 may be modified without heating any of the first end 250 of the pressure containment vessel 120, the second end 260 of the pressure containment vessel 120, the at least one side wall 230 of the pressure containment vessel 120, or the heat transfer medium 240. This is possible because the heat transfer medium 240 disposed within the pressure containment vessel 120 is not heated by the conventional use of combustion. The conventional reactor systems utilize combustion to create the reaction conditions necessary for thermally treating a hydrocarbon-containing stream 210. The combustion creates the elevated temperature and pressure required for upgrading a hydrocarbon containing stream, and the elevated pressure is provided within the reaction tubes, creating a pressure differential between the inside of the reaction tubes and the outside of the reaction tubes. Therefore, the materials of the reaction tubes for conventional reactor systems must be chosen from materials capable of withstanding the necessary pressure differential. Conversely, reactor systems and processes, according to embodiments provided herein, for thermally treating a hydrocarbon-containing stream 210 create the elevated temperature by converting electrical current to heat in the heat transfer medium 240, and the pressure within the pressure containment vessel is controlled, if necessary, through conventional processes known in the art. The reactor systems and processes, according to embodiments provided herein, do not create a pressure differential between the inside the heat transfer medium 240 and the outside the heat transfer medium 240. Instead, the interior chamber of the pressure containment vessel 120 is pressurized via conventional means, thereby pressuring the interior chamber and the heat transfer medium 240 and avoiding a pressure differential. Therefore, the heat transfer medium 240 need not withstand a pressure differential, unlike the reaction tubes of conventional systems and processes. For example, and not by way of limitation, conventional processes for increasing pressure may include pumping gas into the pressure containment vessel 120. The heat transfer medium 240 is heated through the conversion of electrical current to heat at the heat transfer medium 240, but this heating is conducted in the heat transfer medium 240, not throughout the entirety of the pressure containment vessel 120. Although, in embodiments, heat may be radiated from the heat transfer medium 240 to the atmosphere within the pressure containment vessel 120. That is, unlike the conventional systems which used combustion that increases both the pressure and temperature within the entire pressure containment vessel 120, the system and process of the present disclosure directly increases the temperature of the heat transfer medium 240 through conversion of electrical current to heat, which may indirectly increase the temperature of the entire pressure containment vessel 120 by dissipating heat from the heat transfer medium 240 to the atmosphere of the pressure containment vessel 120.

According to embodiments, one or more additional components may be included in the reactor system. In embodiments, such as shown in FIG. 1, a heat exchanger 110 may be fluidly coupled to an inlet of the pressure containment vessel 120. A quench exchanger 130 may be fluidly coupled to at least one of an outlet of the pressure containment vessel 120. In some embodiments, the quench exchanger 130 is fluidly coupled to all outlets of the pressure containment vessel 120. The quench exchanger 130 may function as a heat exchanger. A coolant drum 140 may be fluidly coupled to at least one of an outlet of the quench exchanger 130. The coolant drum 140 may be a steam drum as is known in the art. The coolant drum 140 is a cooling system in which coolant fluid is supplied from the coolant drum to at least one of the outlet of the quench exchanger 130. A steam water circulation loop may exist between the coolant drum 140 and the quench exchanger 130. Boiler feed water may be provided to the coolant drum 140 and steam generated from the coolant drum. In some embodiments, the quench exchanger 130 and the coolant drum 140 may be contained in one structure. A superheater 150 may be fluidly coupled to an outlet of the coolant drum 140. In some embodiments, the outlet of the coolant drum 140 may be a steam outlet. As non-limiting examples, the superheater 150 may be an electrical superheater or a steam superheater. A second heat exchanger 160 may be thermally coupled to an inlet of the heat exchanger 110. The quench exchanger 130 may be fluidly coupled with the second heat exchanger 160.

According to one or more embodiments, a process for converting a hydrocarbon-containing stream 210 to desired products such as, for example, an effluent stream 220 comprising at least one of hydrogen, olefins, or aromatic hydrocarbons that uses the system 100 depicted in the embodiment of FIG. 1 will now be described. A hydrocarbon-containing stream 210 is introduced into the heat exchanger 110. It should be understood that the hydrocarbon-containing stream 210 may comprise at least one of methane, ethane, propane, butane, water ($H_2O$), and low levels of $CO_2$, CO, $N_2$, CO, $CO_2$, and $H_2$, according to various embodiments. In some embodiments, the hydrocarbon-containing stream 210 comprises $C_1$ to $C_5$ hydrocarbons. In other embodiments, the hydrocarbon-containing stream 210 comprises $C_1$ to $C_{20}$ hydrocarbons. In yet another embodiment, the hydrocarbon-containing stream 210 comprises $C_1$ to $C_{50}$ hydrocarbons.

The pressure containment vessel 120, according to embodiments, may use steam to convert the hydrocarbon-containing stream 210 to an effluent stream 220 comprising carbon monoxide (CO) and hydrogen through a steam methane reforming process in the heat transfer medium 240. For instance, according to one or more embodiments, the outlets of the channels 246 of the heat transfer medium 240 is at equilibrium for the following reactions: (1) $CH_4 + H_2O \rightarrow CO + 3H_2$; and (2) $CO + H_2O \rightarrow H_2 + CO_2$. Additionally, unreacted methane and water will be present at the outlets of the channels 246 of the heat transfer medium 240. In some embodiments, CO, $CO_2$, and $N_2$ may be present at the outlets of the channels 246 of the heat transfer medium 240. Furthermore, in some embodiments, a nickel-based catalyst may be present in this reaction. Although the temperature at which the heat transfer medium 240 is operated is not particularly limited so long as it can drive the above reactions, in one or more embodiments, the heat transfer medium 240 is operated at an inlet temperature from 400 degrees Celsius (° C.) to 450° C., such as from 415° C. to 435° C., or about 425° C. In some embodiments, the heat transfer medium 240 is operated at an inlet temperature of greater than 600° C., greater than 700° C., greater than 800° C., greater than 900° C., greater than 950° C., greater than 1000° C., greater than 1050° C., or of up to 1100° C. Likewise, the pressure at which the pressure containment vessel 120 is operated is not particularly limited so long as it can drive the above reactions, in one or more embodiments, the pressure containment vessel 120 is operated at a pressure of 38 bar (3.8 MPa) to 46 bar (4.6 MPa), such as from 40 bar (4.0 MPa) to 44 bar (4.4 MPa), or about 42 bar (4.2 MPa). In embodiments, the feed into the heat transfer medium 240 may comprise from 30 wt. % methane to 40 wt. % methane, such as from 33 wt. % methane to 38 wt. % methane, or about 36 wt. % methane. Accordingly, in embodiments, the hydrocarbon-containing stream 210 into the heat transfer medium 240 may comprise from 60 wt. % water to 70 wt. % water, such as from 62 wt. % water to 67 wt. % water, or about 63 wt. % water.

The process for thermally treating a hydrocarbon-containing stream 210 comprises introducing the hydrocarbon-containing stream 210 into channels 246 of a heat transfer medium 240. As the heat transfer materials 240 is not electrically conductive, the heat transfer material 240 may conduct the thermal energy from the electrical resistors and heat the hydrocarbon-containing stream 210. The hydrocarbon-containing stream 210 may not contact the electrical resistors or the electrical current. The heat transfer medium 240 is positioned within an interior chamber of a pressure containment vessel 120. The process further comprises pressurizing the pressure containment vessel 120 and the heat transfer medium 240 without heating the pressure containment vessel 120 or the heat transfer medium 240. The channels 246 of the heat transfer medium 240 may be fluidly coupled to the interior chamber of the pressure containment vessel 120. This fluid coupling may allow the pressure containment vessel 120 and the channels 246 to pressurize. The process further comprises supplying electrical current to the heat transfer medium 240, converting the electrical current to heat, thereby increasing the temperature of the heat transfer medium 240 without directly heating the interior chamber of the pressure containment vessel 120, thereby heating the hydrocarbon-containing stream 210 within the channels 246 of the heat transfer medium 240. Lastly, the process comprises converting the hydrocarbon-containing stream 210 to an effluent stream 220 within the channels 246 of the heat transfer medium 240, and removing the effluent stream 220 from the channels 246 of the heat transfer medium 240. The fluid coupling from the second end 244 of the heat transfer medium 240 to an inlet of the quench exchanger 130 may be formed to allow laminar flow and equal residence time of the hydrocarbon-containing stream 210 in all channels 246 of the heat transfer medium 240. Although the figures show that the hydrocarbon-containing stream 210 and the effluent stream 220 enter and exit the pressure containment vessel 120 at different locations, it should be understood that the hydrocarbon-containing stream 210 and the effluent stream 220 may enter and exit the pressure containment vessel 120 at any location.

Converting the hydrocarbon-containing stream 210 to the effluent stream 220 may comprise increasing the temperature of the hydrocarbon-containing stream 210, thereby causing a chemical reaction that produces the effluent stream 220. The hydrocarbon-containing stream 210 may be contacted with the channels 246 of the heat transfer medium 240 under reaction conditions sufficient to form an effluent stream 220. The reaction conditions may comprise: a temperature ranging from 300° C. to 450° C., or from 600° C. to 1200° C., such as from 800° C. to 1000° C., or from 825° C. to 900° C.; and a pressure of at least 1 bar (100 kPa), such as at least 2 bar (200 kPa), or at least 3 bar (300 kPa). In other embodiments, the pressure may at least 10 bar (1000 kPa), at least 15 bar (1500 kPa), at least 25 bar (2500 kPa), at least 30 bar (3000 kPa), at least 40 bar (4000 kPa), or at least 50 bar (5000 kPa). In some embodiments, the heat transfer medium 240 is heated to a temperature of greater than 600° C., greater than 800° C., greater than 900° C., greater than 950° C., greater than 1000° C., greater than 1050° C., greater than 1100° C., greater than 1150° C., greater than 1200° C., or greater than 1500° C. The reactions that occur in channels 246 of the heat transfer medium 240 produce an effluent stream 220. In some embodiments, the reactions that occur in the pressure containment vessel 120 further produce byproducts comprising one or more of CO, $CO_2$, $H_2$, $H_2O$, $CH_4$, $C_2H_6$, $C_2H_2$, $C_3H_6$, $C_3H_8$, and $C_3H_4$.

In embodiments, these components may be separated and removed from the pressure containment vessel 120 in different streams. However, in embodiments, a light stream that comprises $H_2$, CO, $CO_2$, and $CH_4$ is recycled and reused in the pressure containment vessel 120, such as by transferring this light stream from the quench exchanger 130 to the heat exchanger 110. This light stream may apply to steam reforming without water present. The systems and methods for separating these streams are known, and any suitable separation can be conducted. Conventional separators, such as acid gas removal processes for $CO_2$, and simple condensation for water removal, may be used. In addition, inerts (such as, for example, nitrogen) may be present in the hydrocarbon-containing stream 210, and the inerts may exit the pressure containment vessel 120 as a purge stream (not shown).

The effluent stream 220 comprises at least one of hydrogen, olefins, and aromatic hydrocarbons. In one or more embodiments, the effluent stream 220 consists essentially of or consists of at least one of hydrogen, olefins, and aromatic hydrocarbons. In embodiments, the olefins comprise $C_2$ to $C_5$ olefins such as, for example, ethylene ($C_2H_4$), propylene ($C_3H_6$), and butylene ($C_4H_8$). In other embodiments, the olefins comprise $C_2$ to $C_{10}$ olefins. The olefins may comprise $C_2$ to $C_{20}$ olefins. In yet another embodiment, the olefins may comprise $C_2$ to $C_{50}$ olefins. In some embodiments, the olefins may comprise diolefins, such as butadiene. The aromatic hydrocarbons may comprise benzene and derivatives thereof, such as toluene, ethylbenzene, o-xylene, p-xylene, m-xylene, mesitylene, durene, 2-phenylhexane, and biphenyl. The effluent stream 220 is collected and used in various other processes to make desired end products.

The process may further comprise preheating the hydrocarbon-containing stream 210 before introducing the hydrocarbon-containing stream 210 to the channels 246 of the heat transfer medium 240 by passing the hydrocarbon-containing stream 210 through a heat exchanger 110. The exit temperature of the heat exchanger 110 may be below the operating temperature of the channels 246 of the heat transfer medium 240. The second heat exchanger 160 can be used to remove heat from the effluent stream 220, wherein the heat removed from the effluent stream 220 can be used to preheat the hydrocarbon-containing stream 210. This may be an optional component to the systems and processes disclosed herein, as the hydrocarbon-containing stream 210 does not need to be preheated prior to introducing the hydrocarbon-containing stream 210 to the channels 246 of the heat transfer medium 240, when the hydrocarbon-containing stream 210 is a vapor stream. There may be one or more heat exchangers 110 and 160, which may be parallel and/or in series. The heat exchangers 110 and 160 may minimize the electrical energy consumption of the system 110.

In some embodiments, the process further comprises removing heat from the effluent stream 220 after removing the effluent stream 220 from the heat transfer medium 240 by passing the effluent stream 220 through a quench exchanger 130. The quench exchanger may cool the effluent stream 220 to below the reaction temperature. Cooling the effluent stream 220 below the reaction temperature prevents further reactions, or conversion, of the effluent stream 220. In some embodiments, the quench exchanger 130 cools to effluent stream 220 to below 1200° C., below 1000° C., below 800° C., below 600° C., or below 500° C. within 1000 milliseconds, 500 milliseconds, 200 milliseconds, 100 milliseconds, or 50 milliseconds. The quench exchanger 130 may operate at a similar or the same pressure as the pressure containment vessel 120. The process may further comprise passing a cold coolant stream 310 through a coolant drum 140 and then to the quench exchanger 130. The process may comprise cooling the effluent stream 220 in the quench exchanger 130 with the cold coolant stream 310. The process may then further comprise passing a hot coolant stream 320 from the quench exchanger 130 to the coolant drum 140. In some embodiments, the process further comprises passing the hot coolant stream 320 to a superheater 150. Passing the hot coolant stream 320 may increase the energy efficiency of the system 100 and maximize the available work contained in the steam. The process may then further comprise using the hot coolant stream 320 in other processes known in the art, such as, as a nonlimiting example, to drive a steam turbine. These are optional components to the systems and processes disclosed herein, as the effluent stream 220 may be cooled according to other methods known in the art. In some embodiments, the process may include passing the effluent stream 220 through a second heat exchanger 160, which may be thermally coupled with the heat exchanger 110. The second heat exchanger 160 may cool the effluent stream 220 and transfer heat from the effluent stream 220 to the heat exchanger 110 to heat the hydrocarbon-containing stream 210. There may be one or more second heat exchangers 160, which may be parallel and/or in series.

At least in part because they do not involve combusting gases within the interior chamber of the pressure containment vessel, embodiments of systems and processes for converting hydrocarbon-containing streams to desired products disclosed and described herein result in decreased coke production over known processes for converting a hydrocarbon containing stream into $C_2$ to $C_5$ hydrocarbons. Coke may form due to catalytic coke formation on the surface of the heat transfer medium 240 or the channels 246 of the heat transfer medium 240, or due to thermal coke formation in the bulk gas phase. Thermal coke that does not deposit on the surface of the heat transfer medium 240 or the channels 246 of the heat transfer medium 240 may continue flowing with the effluent stream 220 to components of the system 100 downstream of the heat transfer medium 240. However, if catalytic coke is present on the surface of the heat transfer medium 240 or the channels 246 of the heat transfer medium 240, it may capture thermal coke formed in the bulk gas phase, adding more coke to a layer of coke on the channels 246 of the heat transfer medium 240. The systems and processes herein reduce or eliminate catalytic coke formation on the heat transfer material 240 and may extend the period between decoking processes or eliminate the need for decoking processes altogether. For instance, in one or more embodiments, the process results in 25%, 50%, 60%, 70%, 75%, 80%, 85%, 90%, 95%, 99%, or 100% less coke production than conventional processes. In some embodiments, the process results in no catalytic coke production.

Additionally, in some embodiments, the systems and processes claimed herein produce no $CO_2$ emissions from the heating process. Specifically, the systems and processes herein utilize electrical heating systems and processes, which result in no direct $CO_2$ production from the heating systems and processes, as compared to conventional systems that utilize combustion reactions to generate heat. These combustion reaction systems and processes conventionally burn methane or other gases, which produce $CO_2$ emissions. By using systems that do not require combustion, $CO_2$ production can be reduced by millions of tons per year. Although the effluent stream 220 may include $CO_2$, the systems and processes claimed herein produce no $CO_2$ emissions from the heating process.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A reactor system for thermally treating a hydrocarbon containing stream comprising:
    a pressure containment vessel comprising an interior chamber defined by a first end, a second end, and at least one side wall extending from the first end to the second end; and
    a heat transfer medium that converts electrical current to heat and is positioned within the interior chamber of the pressure containment vessel, wherein the heat transfer medium comprises:
        an electrical resistor,
        an electrical lead line configured to provide electrical current to the heat transfer medium,
        a first end face,
        a second end face, and
        channels extending between the first end face and the second end face,
    wherein the channels of the heat transfer medium define fluid pathways extending from the first end of the pressure containment vessel to the second end of the pressure containment vessel.

2. The reactor system of claim 1, wherein the heat transfer medium comprises a ceramic selected from the group consisting of aluminum nitride, silicon nitride, boron nitride, barium titanate, silicon carbide, aluminum oxide, magnesium oxide, silicon dioxide, feldspar, and zirconium oxide.

3. The reactor system of claim 1, wherein a critical flow venturi is mechanically coupled to one of the first end face of the heat transfer medium.

4. The reactor system of claim 1, wherein the channels comprise boundary layer disturbing elements that increase fluid turbulence when a fluid flows through the channels.

5. The reactor system of claim 1, wherein the heat transfer medium has a channel surface area of from 450 to 550 $mm^2$.

6. The reactor system of claim 1, wherein the heat transfer medium comprises at least one of silver, iron oxide, molybdenum oxide, vanadium oxide, chromium oxide, nickel oxide, copper oxide, zirconium oxide, potassium carbonate, potassium oxide, titanium oxide, cadmium oxide, aluminum oxide, tin oxide, and/or platinum oxide.

7. The reactor system of claim 1, wherein the heat transfer medium has a combined wall and channel surface area of from 650 to 750 $mm^2$.

8. The reactor system of claim 1, wherein the heat transfer medium has a total surface area of from 0.08 to 0.2 $m^2$ per kilogram per hour of fluid flow at a velocity of from 20 to 250 m/s.

9. The reactor system of claim 1, wherein the heat transfer medium comprises from 50 to 70 heating elements.

10. The reactor system of claim 1, wherein the heat transfer medium produces from 10 to 1000 kW per heating element.

11. The reactor system of claim 1, wherein the heat transfer medium has a max heat flux of from 700 to 800 $J/m^2s$.

12. The reactor system of claim 1, wherein the heat transfer medium has a specific heat capacity of from 0.5 to 1 J/g K.

13. The reactor system of claim 1, wherein the heat transfer medium has a thermal conductivity of from 150 to 200 W/m K.

14. The reactor system of claim 1, wherein the heat transfer medium comprises:
    one or more heating elements; and
    one or more electrical circuits comprising electrodes,
    wherein the one or more heating elements convert electrical current to heat and the heat transfer medium thermally conducts the heat from the one or more heating elements to the channels.

15. The reactor system of claim 1, wherein the heat transfer medium comprises silicon carbide.

16. The reactor system of claim 1, wherein the heat transfer medium has a total power of from 5 to 50 kW.

17. The reactor system of claim 1, wherein:
    the heat transfer medium has a channel surface area of from 450 to 550 $mm^2$;
    the heat transfer medium has a combined wall and channel surface area of from 650 to 750 $mm^2$; and
    the heat transfer medium has a total surface area of from 0.08 to 0.2 $m^2$ per kilogram per hour of fluid flow at a velocity of from 20 to 250 m/s.

18. The reactor system of claim 1, wherein:
    the heat transfer medium comprises from 50 to 70 heating elements; and
    the heat transfer medium produces from 10 to 1000 kW per heating element.

19. The reactor system of claim 1, wherein:
    the heat transfer medium has a max heat flux of from 700 to 800 $J/m^2s$;
    the heat transfer medium has a specific heat capacity of from 0.5 to 1 J/g K; and
    the heat transfer medium has a thermal conductivity of from 150 to 200 W/m K.

* * * * *